Aug. 7, 1962  A. T. PERKS  3,048,242
DISC BRAKE
Filed April 28, 1960  2 Sheets-Sheet 1

INVENTOR
Arthur Thomas Perks
BY
ATTORNEY

Aug. 7, 1962     A. T. PERKS     3,048,242
DISC BRAKE

Filed April 28, 1960     2 Sheets-Sheet 2

INVENTOR
Arthur Thomas Perks
BY
A. Yates Dowell
ATTORNEY

United States Patent Office 3,048,242
Patented Aug. 7, 1962

3,048,242
DISC BRAKE
Arthur Thomas Perks, 37 The Green, Castle Bromwich,
Birmingham, England
Filed Apr. 28, 1960, Ser. No. 25,471
Claims priority, application Great Britain Apr. 28, 1959
4 Claims. (Cl. 188—73)

This invention relates to disc brakes comprising a disc and friction elements adapted to contact the opposite sides of the disc to effect a braking engagement therewith.

The general practice in disc brakes, particularly as applied to road vehicles, is to mount the friction elements on the arms of a rigid caliper which embraces the radially outer annular portion of the disc so that the elements are urged onto the two sides of the radially outer annular portion by two separate piston and cylinder devices carried by the two arms of the caliper. Such a disc brake suffers the disadvantages that it is expensive to manufacture and is difficult to mount in the smaller sizes of modern road vehicle wheels.

It is an object of the present invention to provide a disc brake which overcomes or lessens these disadvantages.

Other objects and advantages will be apparent from the specification and claims and from the accompanying drawings in which:

In FIGURES 1-4 and FIGURE 5, similar reference numerals are used to denote corresponding parts.

Figure 1:
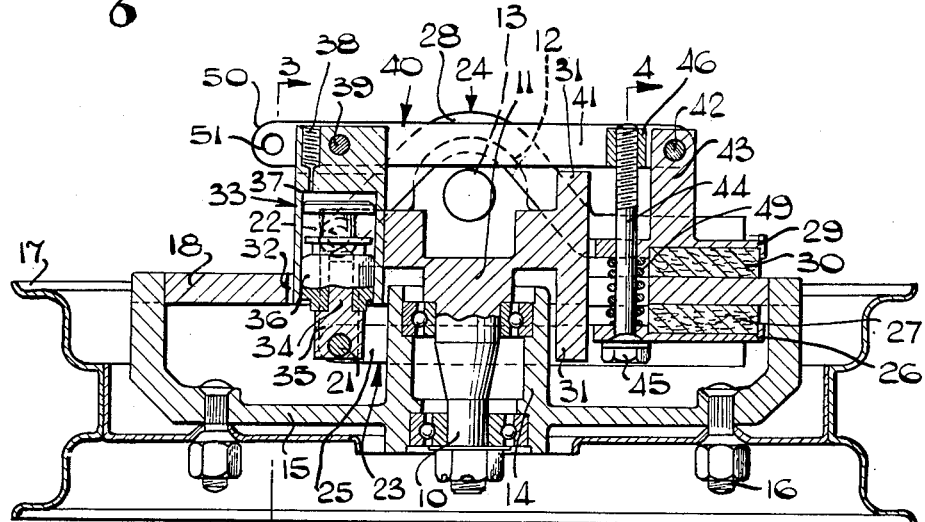
FIGURE 1 is a sectional plan view of a disc brake applied to a front wheel of a road vehicle.

The stub axle 10 is formed as an integral part of a nonrotatable member or block 11 formed with integral upper and lower lugs 12 in which are formed holes 13 to receive a conventional king pin by which the stub axle 10 is maintained in position so as to be swingable about the king pin to enable the vehicle to be steered. Mounted on the stub axle 10 in an anti-frictional manner in a hub 14 formed integrally with a spider 15 to which is secured by bolts 16, the wheel rim 17 on which a pneumatic tyre can be mounted.

The ends of the arms of the spider 15 extend axially of the stub axle and in an inboard direction and secured to the inboard ends of the arms of the spider is a flat annular disc 18 which is made of any suitable metal. The ends of the arms are formed as keys 19 which engage slots in the outer peripheral edge of the disc 18 so that the disc is positively rotated by the spider which forms a driving means, and screw means, not shown, are employed to secure the disc to the spider.

Figure 3:
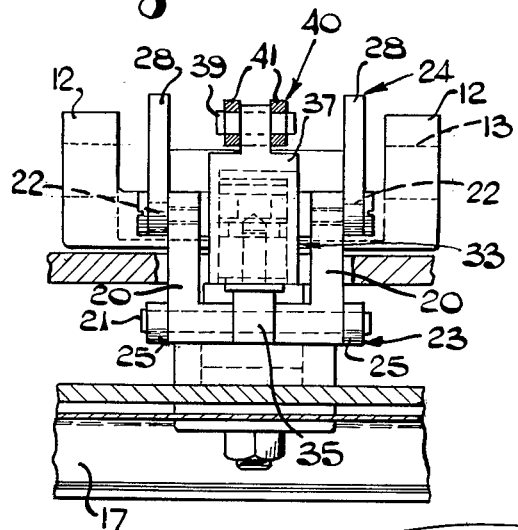
FIGURE 3 is a fragmentary sectional view of FIGURE 1 on the lines 3—3 thereof.
Figure 4:
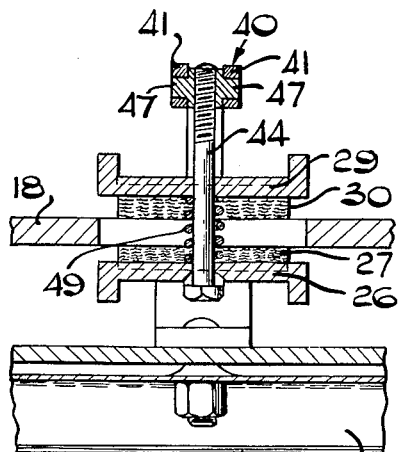
FIGURE 4 is a fragmentary sectional view of FIGURE 1 on the lines 4—4 thereof, and, FIGURE 5 is a similar view to FIGURE 2 but showing the application of a disc brake to the rear wheel of a road vehicle.

The block 11 is bifurcated at one end to provide two limbs 20 which are each substantially L-shaped as shown in FIGURE 3, and secured in the two limbs is a pivot pin 21 and a pair of co-axial pivot pins 22, the pivot pin 21 being disposed on the outboard side of the disc 18 and the co-axial pivot pins 22 are disposed on the inboard side of the disc 18 and the axes of the pivot pins are parallel with an effective plane of the disc 18.

The pivot pins 21 and 22 afford fixed pivot points for friction pad carrier arms 23 and 24 respectively, and the arm 23 is formed by a pair of side-by-side spaced apart members 25 disposed one at each side of the block 10 and extending in parallel relation from one side of the axis of the stub axle to the other side thereof and at which other side the two members are connected together by a shoe 26 in which is supported a friction element or pad 27 the inboard face of which, lies parallel with, and adjacent, the outboard face of the disc. The other arm 24 is also composed of two side-by-side spaced apart members 28 which are arranged as shown in FIGURE 1 to pass around the inner side of the king pin 13, and these members extend from the pivot pins 22 on one side of the axis of the stub axle to the other side of the axis where they are connected together by a shoe 29 in which is supported a friction element or pad 30 of which the outboard face is disposed parallel with, and adjacent to, the inboard face of the disc 18. It follows therefore, that the two friction elements 27 and 30 are supported at free ends of the arms 23 and 24 respectively so as to be swingable towards and away from the disc about fixed pivot pins 21 and 22 disposed on the opposite side of the axis of the stub axle from that side on which the friction elements are disposed.

Figure 2:
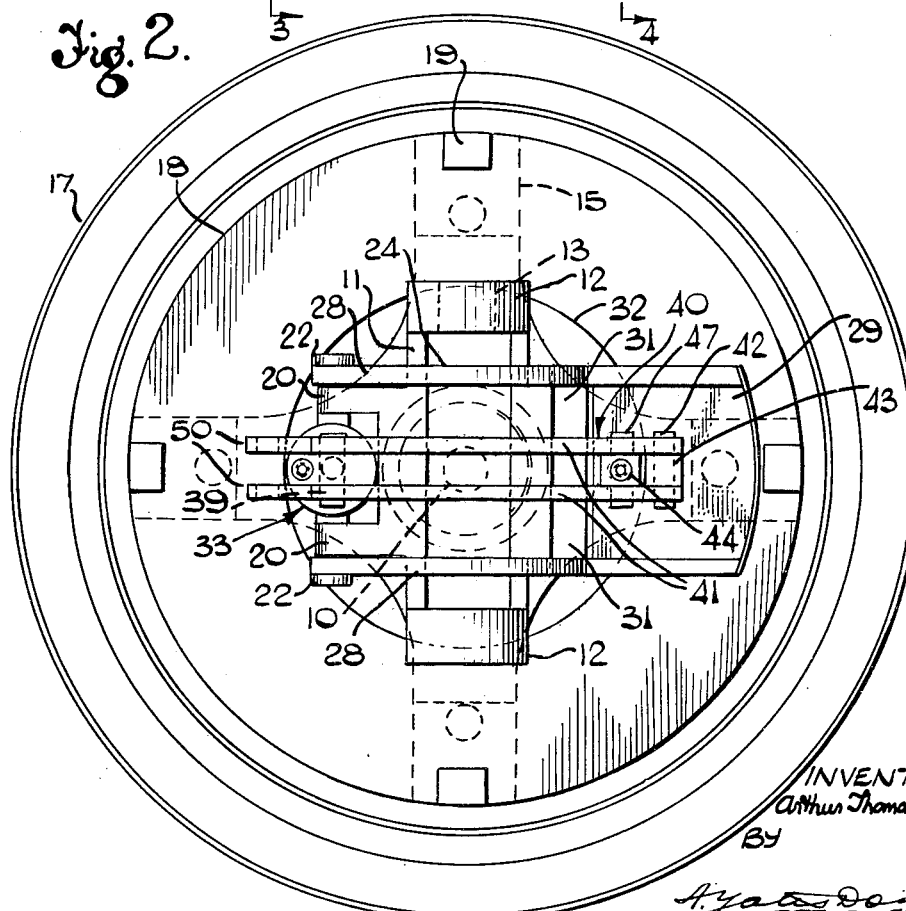
FIGURE 2 is a plan view of FIGURE 1.

As before stated, the arms 23 and 24 are supported in a stationary manner by the block 11 at their ends remote from the friction elements and at a position adjacent the friction elements the arms are supported in a manner resisting rotation in both directions about the axis of the stub axle by means of support bosses 31 integral with the block 11 and against which bosses the inner faces of the members 25 and 28 bear, as shown in FIGURE 2.

Disposed within the bore 32 of the annular disc 18, is a single fluid-pressure operated means in the form of a hydraulically operated piston and cylinder actuating device 33, the axis of which is disposed parallel with the axis of the stub axles 10 and said means extends through the bore 32 in the locality of the pivot pins 21 and 22.

The actuating device 33 comprises a piston rod 34 formed with an enlargement 35 at one end and this enlargement is disposed between the L-shaped limbs 20 and is pivotally mounted on the pivot pin 21. Mounted on the piston rod 34 is a piston 36 which is freely movable axially of the piston rod for a purpose hereinafter to be described, and the piston is disposed within a cylinder 37 into which fluid pressure can be introduced through an opening 38.

Secured in the cylinder 37 is a pivot pin 39 on which is mounted an actuating lever 40 composed of a pair of side-by-side spaced apart members 41, and this lever extends from one side of the axis of the stub axle 10 to the other side and is connected at this end, by a pivot pin 42 to a pug 43 rigid with the shoe 29 which carries the friction element 30.

The lever 40 is also connected to the shoe 26 which carries the other friction element 27 by means of a screw 44 which extends parallel with the axis of the stub axle 10. The screw is formed at its one end with a head 45 and the underside of the head seats in a recess in the shoe 26 and the shank of the screw 44 passes freely through a clearance hole in the shoe 26 and also through a clearance hole in the shoe 29 and at its end remote from the head is screw-threaded and engages a trunnion block 46 which is formed with a screw-threaded bore to receive the screw-threaded end of the screw 44. The trunnion block 46 is formed with a pair of co-axial trunnions 47 which are pivotally mounted in the members 41 of the actuating lever 40 and the pivot point of the lever 40 formed by the trunnions 47, constitutes the fulcrum for the actuating lever 40 and this fulcrum is disposed between the pivot pins 39 and 42 and adjacent the pivot pin 42.

Mounted on the shank of the screw 44 is a helical compression spring 49 which operates against the shoes 26 and 29 to urge these shoes apart and thus also to urge the friction elements 27 and 30 away from the disc 18.

In operation, when fluid pressure is introduced into the cylinder 37 such as by depression of the brake pedal in a motor vehicle, the piston 36 is caused to abut the enlargement 35, as shown in FIGURE 1, so that the piston remains stationary and the cylinder 37 is thus caused to move relative to the piston in an upward direction as viewed in FIGURE 1. The lever 40 tends to be rotated in a clock-wise direction about the fulcrum formed by the trunnions 47 whereby the shoe 29 and friction element 30 are moved towards the disc 18 and since the trunnion block is not stationarily positioned, a pull is exerted on the connecting screw 44 so that the shoe 26 and the friction element 27 are pulled towards the disc 18. There is thus a mutual force acting on the friction elements urging them towards each other when fluid pressure is introduced into the actuating device 33 and in this way a frictional braking force is imposed on the disc 18 which is rotatable with the rim 17.

When the fluid pressure in the actuating device 33 is released, the compression spring 49 operates to urge the friction elements 27 and 30 apart and away from the disc 18. It should be appreciated that the tendency for the friction elements 27 and 30 to rotate with the disc 18, is adequately resisted by the carrier arms 23 and 24 which are supported by the block 10 on opposite sides of the axis of the stub axle 10 and one of which supports, provided by the bosses 31, is closely adjacent the friction elements 27 and 30.

To enable the brake to be applied by operation of a hand brake in the vehicle, the hand brake is connected by a cable to an extension 50 provided on the actuating lever adjacent the actuating device 33 and for which purpose the extension 50 is formed with a hole 51.

By operation of the hand brake to urge the friction elements 27 and 30 against the disc, the lever 40 is rotated in a clock-wise direction about the axis of the trunnions 47 and the cylinder is thus lifted, as viewed in FIGURE 1, and by reason of the piston 36 being axially movable on the piston rod 34, the resulting tendency to create a vacuum in the cylinder 37, causes the piston 36 to be drawn axially along the piston rod 34. Thus, the actuating device 33 provides a lost-motion movement which permits the friction elements to be operated by the hand brake and the actuating device does not resist this operation by the hand brake.

Figure 5:
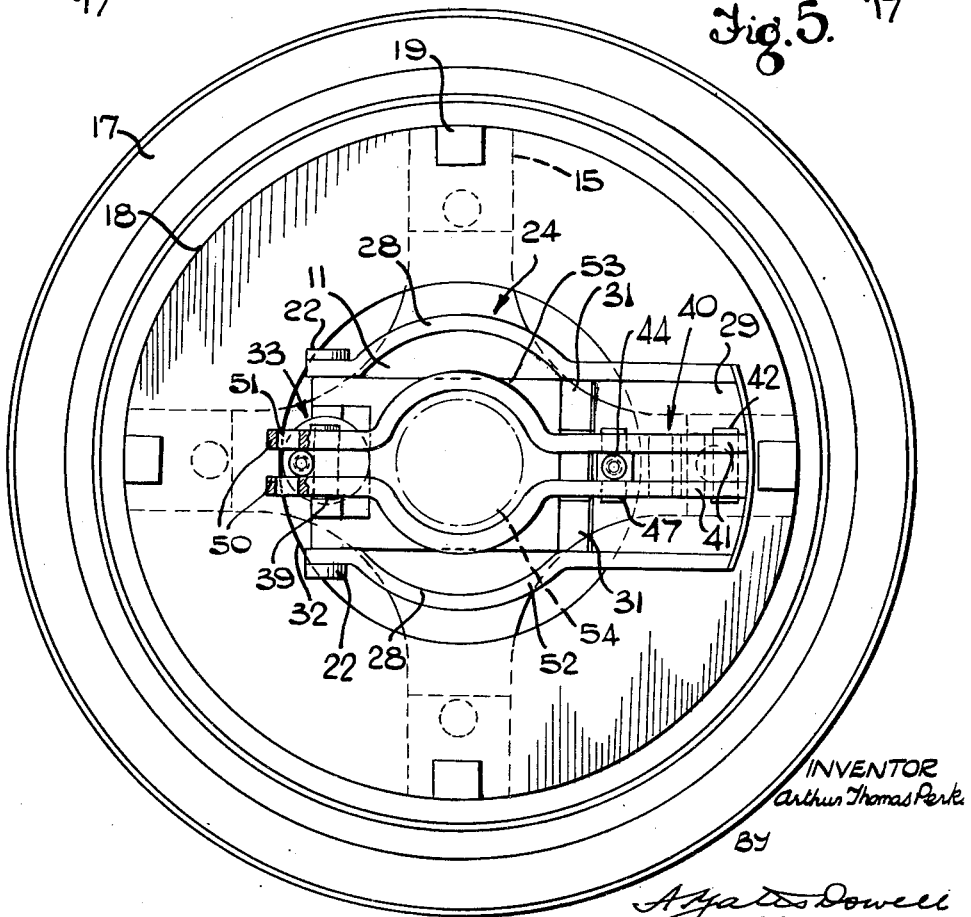

In the form of the invention described in FIGURES 1-4 as applied to the front wheel of a road vehicle, the members 25 and 28 of the carrier arms 23 and 24 respectively, are disposed parallel as clearly shown in FIGURE 2. In FIGURE 5 however in which the invention is shown applied to the rear wheel of a road vehicle, the members 25 and 28 of the carrier arms 23 and 24, are curved at 52 and the members 41 of the actuating lever 40, are curved at 53 so as to pass around and clear the rear axle 54 of the road vehicle but in other respects the form of the invention shown in FIGURE 5 is identical with or similar to the form of the invention shown in FIGURES 1-4.

In both forms of the invention, adjustment of the friction elements 27 and 30 relative to the disc 18 to take up wear can be obtained by rotation of the screw 44 to draw the elements closer together and towards the disc 18.

It will be appreciated that by reason of the relative disposition of the pivot points provided by the pins 39, 42, and 47, a step-up lever means is provided whereby a greater load will be applied by the friction elements 27 and 30 on the disc 18 than is the effort applied to the actuating lever by means of the actuating device 33 and in addition to the advantage obtained by this increased leverage, a further advantage results in that a smaller diameter piston and cylinder device can be utilised than in previously known arrangements.

It is found in practice, that the invention provides a friction disc brake which contains fewer parts than in known arrangements so that it is less expensive to produce and assemble than known arrangements and furthermore, a disc brake arrangement according to the present invention can be more easily accommodated than the known disc brake arrangements, in the smaller road wheels at present used in road vehicles.

The invention provides the further advantage that the hand brake of a road vehicle operates the same mechanism that the foot brake of the road vehicle operates so that no additional mechanism for operation by the hand brake is required and the cost of the arrangement according to the present invention is much less than the cost of previously known arrangements and is also much less complicated than the previously known arrangements.

What I claim then is:

1. A friction disc brake arrangement including in combination a rotatable disc, driving means connected to the outer peripheral part of the disc so as positively to rotate the disc, a non-rotatable member extending through the bore of the annular disc, a pair of friction pad carrier arms pivotally mounted on the non-rotatable member about an axis parallel with the effective plane of the disc and on one side of the axis of rotation of the disc and extending to the opposite side of the axis of the disc at which position the free end of one arm is disposed on one side of the disc and the free end of the other arm is disposed on the other side of the disc, a pair of friction pads of which one is associated with the free end of one arm and the other is associated with the free end of the other arm so as to be co-operable with the disc, fluid-pressure operated means associated with the friction pad carrier arms to urge the free ends of the arms towards the disc and thus the friction pads into frictional engagement with the disc and each friction pad carrier arm at a position between its pivoted and free end bearing against the non-rotatable member extending through the bore of the disc so that each arm and thus each friction pad is supported against rotary movement with the disc in both directions of rotation thereof when the friction pads engage the disc.

2. A friction disc brake arrangement including in combination a rotatable annular disc, driving means connected to the outer peripheral part of the disc so as positively to rotate the disc, a non-rotatable member extending through the bore of the annular disc, a pair of friction pad carrier arms pivotally mounted on the non-rotatable member about an axis parallel with the effective plane of the disc and on one side of the axis of rotation of the disc and extending to the opposite side of the axis of the disc at which position the free end of one arm is disposed on one side of the disc and the free end of the other arm is disposed on the other side of the disc, a pair of friction pads of which one is associated with the free end of one arm and the other is associated with the free end of the other arm so as to be co-operable with the disc, fluid-pressure operated means associated with the friction pad carrier arms to urge the free ends of the arms towards the disc and thus the friction pads into frictional engagement with the disc and each friction pad carrier arm being formed by a pair of members which extend from one end of the arm to the other end thereof and are spaced apart in side-by-side relation on opposite sides of the axis of the disc and at positions between the ends of the arms said members bear on their inner opposed sides against the non-rotatable member extending through the bore of the disc so that each arm and thus friction pad is supported against rotary movement with the disc in both directions of rotation thereof when the friction pads engage the disc.

3. A friction disc brake arrangement including in combination a rotatable annular disc, driving means connected to the outer peripheral part of the disc so as positively to rotate the disc, a non-rotatable member extending through the bore of the annular disc, a pair of friction pad carrier arms pivotally mounted on the non-rotatable member about an axis parallel with the effective plane of the disc and on one side of the axis of rotation of the disc and extending to the opposite side of the axis of the disc at which position the free end of one arm is disposed on one side of the disc and the free end of the other arm is disposed on the other side of the disc, a pair of friction pads of which one is associated with the free end of one arm and the other is associated with the free end of the other arm so as to be co-operable with the disc, each friction pad carrier arm being formed by a pair of members which extend from one end of the arm to the other end thereof and are spaced apart in side-by-side relation on opposite sides of the axis of the disc and at positions between the ends of the arms said members bear on their inner opposed sides against the non-rotatable member extending through the bore of the disc so that each arm and thus each friction pad is supported against rotary movement with the disc in both directions of rotation thereof when the friction pads engage the disc, a single fluid pressure operated actuating means comprising piston and cylinder elements and which single means extends through the bore of the annular disc and one of which elements is supported stationarily by the non-rotatable member and the other of which elements is connected to the friction pad carrier arms by step-up lever means so that the friction elements apply a greater load to the disc than is applied to the lever means by the actuating means.

4. A friction disc brake arrangement including in combination a rotatable annular disc, driving means connected to the outer peripheral part of the disc so as positively to rotate the disc, a non-rotatable member extending through the bore of the annular disc, a pair of friction pad carrier arms pivotally mounted on the non-rotatable member about an axis parallel with the effective plane of the disc and on one side of the axis of rotation of the disc and extending to the opposite side of the axis of the disc at which position the free end of one arm is disposed on one side of the disc and the free end of the other arm is disposed on the other side of the disc, a pair of friction pads of which one is associated with the free end of one arm and the other is associated with the free end of the other arm so as to be co-operable with the disc, each friction pad carrier arm being formed by a pair of members which extend from one end of the arm to the other end thereof and are spaced apart in side-by side relation on opposite sides of the axis of the disc and at positions between the ends of the arms said members bear on their inner opposed sides against the non-rotatable member extending through the bore of the disc so that each arm and thus each friction pad is supported against rotary movement with the disc in both directions of rotation thereof when the friction pads engage the disc, a single fluid pressure operated actuating means comprising piston and cylinder elements and which single means extend through the bore of the annular disc in the locality of the pivotal mounting of the friction pad carrier arms on the non-rotatable member and one of which elements is supported stationarily by the non-rotatable member and the other of which elements is connected to the friction pad carrier arms by step-up lever means so that the friction elements apply a greater load to disc than is applied to the lever means by the actuating means.

References Cited in the file of this patent
UNITED STATES PATENTS

| | | |
|---|---|---|
| 1,572,870 | Armstrong | Feb. 16, 1926 |
| 2,115,083 | Pierce | Apr. 26, 1938 |
| 2,176,468 | Morin et al. | Oct. 17, 1939 |
| 2,867,295 | Butler | Jan. 6, 1959 |